United States Patent [19]
Populin et al.

[11] 3,943,862
[45] Mar. 16, 1976

[54] SUGAR CANE PLANTING APPARATUS

[76] Inventors: Peter Populin; Louis Populin, both of P.O. Box 19; Guiseppe Scalia, P.O. Box 316, all of, Home Hill, Australia

[22] Filed: Oct. 4, 1974

[21] Appl. No.: 511,945

[30] Foreign Application Priority Data
Oct. 10, 1973    Australia.............................. 5171/73

[52] U.S. Cl................................. 111/3; 214/83.36
[51] Int. Cl.²......................................... A01C 11/00
[58] Field of Search.......... 111/3, 1; 214/83.36, 519

[56] References Cited
UNITED STATES PATENTS

| | | | |
|---|---|---|---|
| 1,678,643 | 7/1928 | Kassebeer............................. | 111/3 |
| 2,840,269 | 6/1958 | Anderson........................ | 111/202 R |
| 2,841,103 | 7/1958 | Arceneaux........................... | 111/3 X |
| 3,279,400 | 10/1966 | Gonzalez............................. | 111/3 |
| 3,344,830 | 10/1967 | Longman............................. | 111/3 X |
| 3,404,808 | 10/1968 | Boudreaux, Jr...................... | 111/3 X |

*Primary Examiner*—Stephen C. Pellegrino
*Attorney, Agent, or Firm*—Hill, Gross, Simpson, Van Santen, Steadman, Chiara & Simpson

[57] ABSTRACT

A sugar cane planting apparatus has a conveyor which is preferably continuous and has spaced horizontal trough elements for taking up sugar cane billets from a supply bin and arranged to discharge the billets one at a time to a planting head with the billets arranged parallel to the direction of motion of the apparatus whereby the billets are planted substantially in end-to-end relation. For controlling the billet supply, the conveyor extends upwardly and is cranked so that any second billet lying on top of a billet in the trough rolls back into the bin and any upstanding billet is deflected by a fixed deflecting plate in the upper crank part. A casing guides the billets on the downward run, each billet falling from the trough (in which it is moved on the upward run) when the trough turns over the top of the conveyor, the billet falling onto the back of the preceding trough.

9 Claims, 3 Drawing Figures

SUGAR CANE PLANTING APPARATUS

BACKGROUND OF THE INVENTION

The present invention relates to sugar cane planting apparatus.

In the past, cane has been cut and stripped by hand before being fed manually as a long stick into a planting machine which is mounted on a tractor. The planting machine receives the cane and chops it into short billets which are then laid in a trench and covered by earth as the tractor moves across a previously ploughed field. It will be apparent that this planting operation is relatively slow, requires a large amount of manpower and is accordingly extremely expensive. These problems have long to be recognised but the applicants are not aware of others offering an effective solution.

The present invention has the object of minimising labour needed to plant sugar cane and to provide for accurate and efficient planting to occur so that acceptable yields will result.

It is known to harvest sugar cane using harvesting machines which chop the sugar cane into so-called "billets" which typically may be 40 cm. long. After harvesting the cane is then processed, although it is necessary to remove any superfluous exterior vegetable matter associated with the cane before processing.

The present invention is particularly concerned with apparatus designed to use sugar cane billets which for the purpose of planting rather than processing will be green cane, i.e. cut before any of the superfluous matter, known as trash, is burnt off or otherwise removed. Typically each billet will have two or three "eyes" which will be the point from which new shoots will originate when the billet is planted. The shoots will then emerge from the soil and grow to form sugar cane for the next harvest.

SUMMARY OF THE INVENTION.

The invention consists in a sugar cane planting apparatus in which an upwardly extending conveyor is provided for conveying billets from a storage bin to a discharge point. The billets are taken up by billet supply means which move upwardly and during the upward run are subjected to the effect of an overhang in the upper portion of the conveyor so that any second billet lying on top of a first billet supported on a billet support of the billet supply means tends to roll off and fall back into the bin. Furthermore, a wall is provided in the upper portion of the conveyor so that as the billet support moves adjacent the wall any upstanding billet is ejected back into the bin. Guide means are provided for guiding the billets in turn from the discharge station arranged at the top of the conveyor down to a point in the bottom portion of the apparatus which is adapted to co-operate with a planting head.

By use of the invention cane planting can be provided for on an efficient basis which minimises manpower.

As far as the economics are concerned, use of the present invention permits effective use to be made of expensive harvesting machines at a time of year at which they are not usually used and this permits use of invested capital. It would be possible to plant sugar cane using a machine embodying the present invention with one man driving a tractor to which the machine is fixed, one man at another location operating a chopper harvester and another man operating a truck to convey the cut billets from the harvester to the planter. This compares with a traditional method comprising one man on a tractor and two men on a machine if it is a double row machine, and many persons for cutting and stripping the cane by hand and subsequently loading the planting machine.

In an important and preferred embodiment of the invention, the conveyor is a continuous conveyor, for example comprising trough-like elements spaced at intervals transversely across the conveyor and a moving element such as a chain for carrying and moving the trough-like elements.

However, it is to be understood that other embodiments are also possible. For example, a reciprocating element could be used for the purpose of sequentially supplying sugar cane billets to the discharge station.

Other features which can be embodied with advantage in arrangements embodying the present invention will become apparent from the following description of an embodiment of the invention which is described by way of example. In the drawings:-

Figure 1:
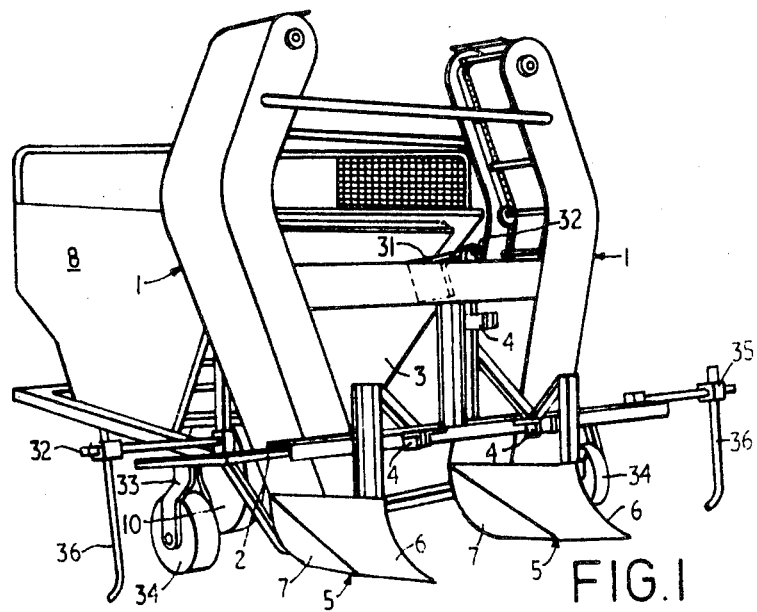
FIG. 1 is a perspective view from the front of a sugar cane planting apparatus.

In the drawings, the apparatus shown is a two-row apparatus for simultaneously planting two parallel rows of sugar cane, the apparatus comprising a pair of conveyors 1 mounted on a framework 2 which also carries a pair of small supply bins 3 for supplying sugar cane to the conveyors. This unit is adapted to be supported on the back of a tractor through a conventional three-point linkage, the frame 2 carrying suitable brackets 4 for this linkage. Thus, the height of the apparatus above the ground can be controlled by adjusting the linkage on a tractor. At the bottom of each conveyor a planting head 5 is provided, the planting head comprising a plough-like nose 6 for forming a furrow in previously ploughed ground, side walls defining a central cavity through which sugar cane is to be dropped and a rear wall portion 7 shaped to push the earth to cover the billet when laid.

Figure 3:
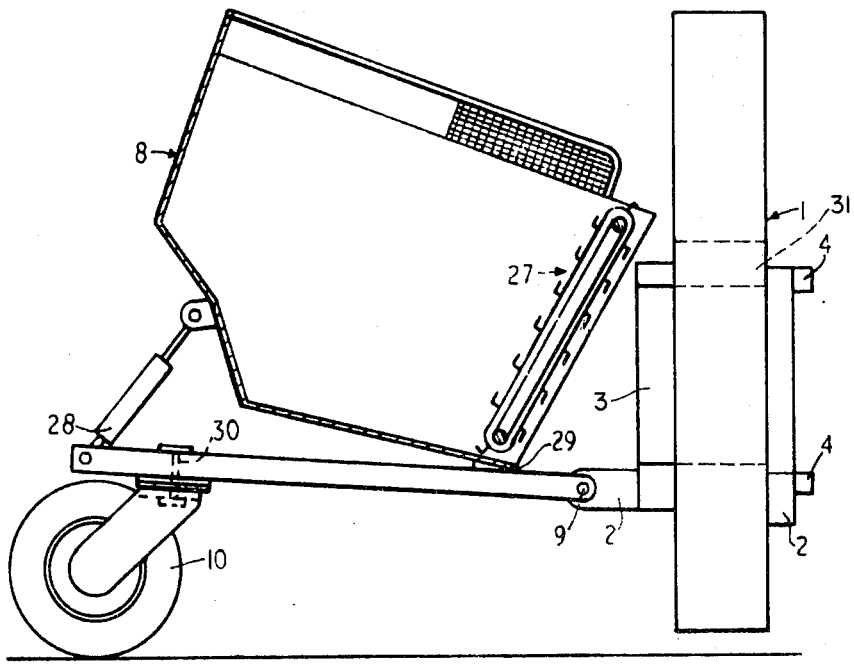
FIG. 3 is a side view of part of the apparatus of FIG. 1 with certain apparatus components being illustrated in elevation.

The apparatus also includes a trailer bin 8 which is pivotally connected through a pivotal connection 9 shown best in FIG. 3 to the rear of the frame 2, the trailer bin having its own single wheel 10 for supporting the bin on the ground. The purpose of the trailer bin is to permit a large supply of billets to be loaded into the apparatus to permit a substantial acerage to be planted in one operation.

Figure 2:
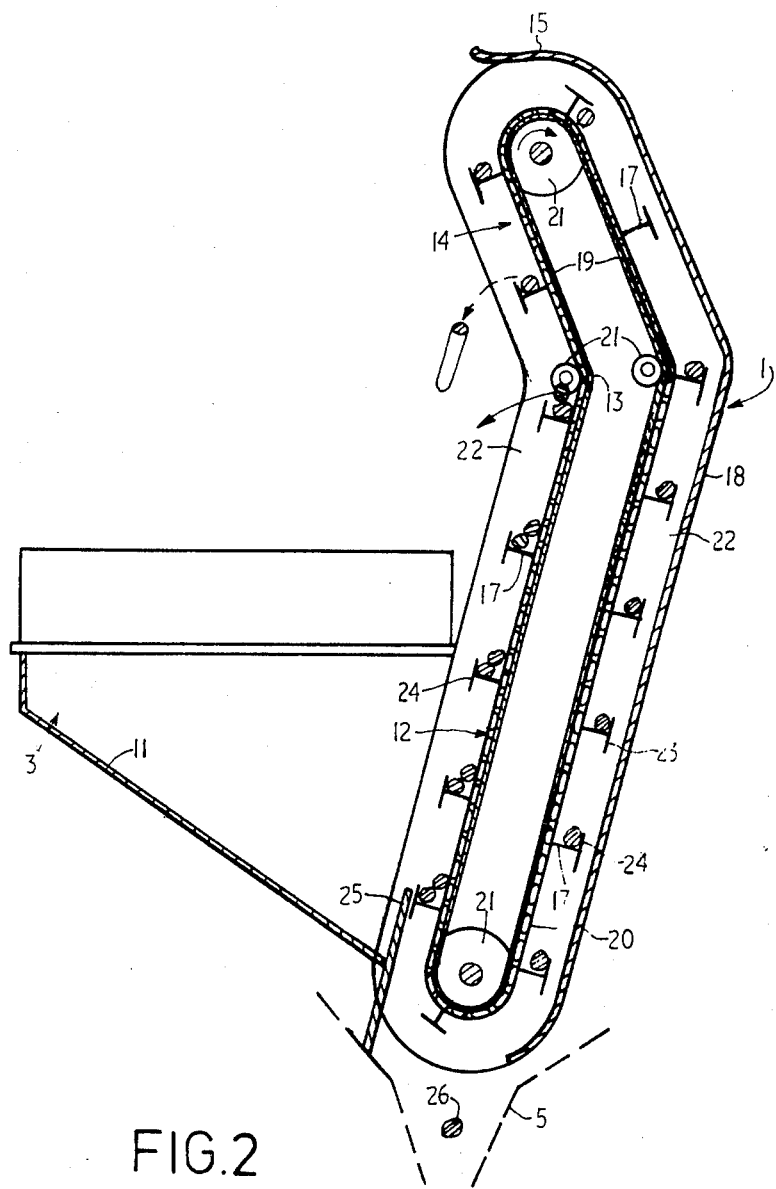
FIG. 2 is a somewhat schematic front cross-sectional view illustrating one of the bins and conveyors of the machine of FIG. 1 with portions of the bin shown in elevation.

Reference will now be made to FIG. 2 for the purpose of describing in detail one of the conveyors and its associated supply bin 3. The other conveyor and bin is a mirror image configuration.

The supply bin 3 has spaced front and rear walls extending vertically the front wall being co-planar with the leading face of the casing of the conveyor 1, and an inclined wall 11 which provides effectively a side wall and floor down which the billets tend to fall to the bottom corner of the bin. The remaining wall of the bin is effectively provided by a lower portion 12 of the upward run of the conveyor which extends upwardly to a bend 13 from which point an upper portion 14 of the upward run overhangs back towards the bin 3 for the purpose of ejecting surplus billets. The top of the conveyor 15 defines a discharge station for discharging one billet at a time. The descent of the billet along the downward run 16 of the conveyor is controlled by guide means which in this embodiment are provided by the rear face of each billet supply element 17 in cooperation with an exterior casing 18 and wall means is the form of an interior sheet structure 19 disposed adjacent the sides of the billet supply elements 17.

It will be noticed that the conveyor runs in a clockwise direction as shown in the drawing, each billet supply element 17 in turn being moved up through the bin 3. Each supply element 17 is in the form of a trough extending transverse the conveyor between respective chains 20 at each side of the conveyor, suitable sprocket wheels 21 being provided at the top, bottom and bend of the conveyor for guiding the chains. One of the sprocket wheels is driven by a chain drive geared to the main wheels of the tractor, the gear ratio being chosen such that the billets are dropped in end-to-end relationship. Each chain runs in an appropriate steel channel 22 for guarding purposes and conveniently the end faces of each billet supply element 17 runs in the channel section also to retain billets at the trough ends.

It will be noticed that each supply element is provided by a flat bar having a large upwardly extending lip 23 (when considering the element on the upward run of the conveyor) and a small downwardly extending lip 24. As each supply element turns the bottom of the conveyor, the lips move adjacent a shielding plate 25 extending up into the bin by an amount approximately equal to the spacing of the supply elements. For clarity the bin 3 is shown empty but normally it will be kept full of billets which move into the spaces above each element 17 during its motion. Each element 17 will normally pick up several billets and normally one of the billets will adopt a lying down attitude with other billets lying on top of it or standing up. It is necessary to eject these superfluous billets and this is provided by the overhang in the upper portion 14 of the conveyor. It will be observed that the inner sheeting 19 extends completely around the conveyor adjacent the inner side of each supply element 17 to prevent billets falling into the interior of the conveyor.

As the supply elements 17 reach the overhang portion, any second billet lying on a first billet will fall off and fall back into the bin 3, this arrangement being provided by suitably dimensioning the supply elements and in particular the height of the upstanding lip. Any billet standing up will fall off by virtue of its engagement with a sheeting 19.

When each supply element reaches the top of the conveyor, the billet falls to land on the back of the preceding supply element, the small retaining lip being sufficient to retain the single billet until it reaches the bottom of the conveyor and drops (see billet 26 in the drawing) into the planting head 5 which is illustrated schematically.

Referring now to FIG. 3, the trailer bin 8 has a conveyor 27 at its front wall which is forwardly inclined and overhangs partially the top opening to the bins 3. This conveyor 27 is adapted to be driven by a hydraulic motor under the control of the driver so as to keep the bins 3 full.

When the load in the bin tends to be diminished then a hydraulic ram 28 is operable to tilt upwardly the bin about a pivotal mounting 29 at the forward bottom edge of the bin. It is also possible to construct an embodiment in which only the floor and rear wall portion of the bin is displaced, the sides and front wall and conveyor 22 remaining fixed. The trailer bin can readily be towed behind a tractor because only a central wheel 10 is provided, this being pivotally mounted as at 30 about a vertical pin.

For the purpose of moving the apparatus between planting locations, the three-point linkage on the tractor is operated to raise the conveyor unit which in turn raises the front end of the trailer bin by virtue of the pivotal connection 9.

The apparatus also includes further advantageous features which are illustrated in FIG. 1. A pivotable flap 31 is mounted at the top of the adjacent side walls of the bins 3, the flap being pivotable about a horizontal axis extending in the direction of movement of the apparatus. A handle 32 extends upwardly for gripping by a driver of a tractor on which the apparatus is mounted and a retaining device (not shown) is provided for retaining the flap in an angled position. The purpose of the flap is to preferentially direct billets downwards from the conveyor 27 of the trailer bin into whichever of the bins 3 has a reduced quantity of billets therein.

At each side of the apparatus, the frame 2 carries suspension brackets 33 on which respective tamping rollers 34 are mounted directly behind the respective planting heads 5 so that the soil covering the planted billets is pressed down.

To assist the tractor driver, an adjustable guide arm 35 is provided at each side of the apparatus, each guide arm having a vertical rod 36. The relevant rod 36 is positioned over the adjacent row of billets which have already been planted so that the desired billet spacing across the field is provided. The arms 35 can be pivoted inwardly for retracted positions and for narrowing the position for transport on the rod.

We claim:
1. A sugar cane planting apparatus comprising
   a. means for mounting the apparatus for movement across a field along a planting path;
   b. a bin for receiving a supply of sugar cane billets;
   c. a billet discharge station;
   d. a conveyor having an upward run extending upwardly from a billet take-up point within the bin for delivering billets to said billet discharge station;
   e. billet supply means included in the conveyor for engaging and conveying said billets and comprising billet supports dimensioned and shaped to support a single billet for delivery to said discharge point;
   f. means for transmitting driving force to said billet supply means for supplying said billets sequentially and intermittently to said discharge station;
   g. guide means mounted for guiding downward motion of billets from said discharge station, the guide means for delivering the billets for planting with the longitudinal direction of each billet extending substantially parallel to said planting path;
   h. said upward run of the conveyor having an upper portion overhanging said bin whereby any second billet lying on top of a first billet supported on a billet support falls back into said bin; and
   i. wall means located at said upper portion of said upward run for deflecting back into said bin any billet upstanding from a billet support.

2. Apparatus as claimed in claim 1, wherein said transmitting means comprises a driven axle at one end of the conveyor and a second axle at the other end of the conveyor, flexible continuous elements at respective sides of the conveyor mounted for motion on the axles, and each of said billet supports comprises an element having end portions mounted on said flexible continuous elements.

3. Apparatus as claimed in claim 2, wherein each said billet support extends substantially parallel to said plainting path and said guide means comprises a downwardly extending enclosed zone of substantially rectangular shape, the length thereof extending substantially parallel to said planting path.

4. Apparatus as claimed in claim 3, wherein each said billet supply element is a rigid element providing a trough slightly larger than said billets.

5. Apparatus as claimed in claim 3, wherein said wall means is provided by a fixed plate extending adjacent said upward run along which said billet supports move.

6. Apparatus as claimed in claim 5, wherein said fixed plate extends around the conveyor to provide a backing plate immediately behind said billet supports on the return run of the conveyor.

7. Apparatus as claimed in claim 4, wherein each said rigid element has a surface facing away from the direction of motion thereof and uppermost during downward motion thereof, said guide means being co-operating with each rigid element for supporting a billet during downward motion thereof, the supported billet having been discharged from the next succeeding rigid element at the discharge station, the billet falling under gravity onto the rigid element.

8. In combination, apparatus as claimed in claim 1, wherein said means for mounting the apparatus comprises mounting brackets whereby the apparatus can be supported on a vehicle, and a sugar cane planting head mounted on the bottom of the guide means for co-operation therewith.

9. The combination as claimed in claim 8, and further comprising a bulk supply trailer bin having wheel means, connection means for connecting the trailer bin to the planting apparatus, bin means for receiving and holding a large supply of billets and conveyor means selectively operable to transport billets to said bin of the planting apparatus.

* * * * *